United States Patent
Flodén et al.

(10) Patent No.: US 6,230,002 B1
(45) Date of Patent: May 8, 2001

(54) METHOD, AND ASSOCIATED APPARATUS, FOR SELECTIVELY PERMITTING ACCESS BY A MOBILE TERMINAL TO A PACKET DATA NETWORK

(75) Inventors: Anders Flodén, Sollentuna; John Darroch, Stockholm; Lena Johansson, Spånga; Berndt Ove Johannsen, Täby, all of (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 08/974,135

(22) Filed: Nov. 19, 1997

(51) Int. Cl.$^7$ ....................................... H04Q 7/20
(52) U.S. Cl. .................. 455/411; 455/422; 455/466; 455/557
(58) Field of Search ..................... 455/410, 411, 455/422, 432, 436, 466, 556, 557, 558; 379/355, 356, 357; 380/247, 248, 271

(56) References Cited

U.S. PATENT DOCUMENTS

| | | | |
|---|---|---|---|
| 5,276,729 | * 1/1994 | Higuchi et al. | 379/355 |
| 5,301,234 | * 4/1994 | Mazziotto et al. | 455/410 |
| 5,455,863 | * 10/1995 | Brown et al. | 455/410 |
| 5,465,401 | * 11/1995 | Thompson | 455/411 |
| 5,500,888 | * 3/1996 | Chiu et al. | 455/410 |
| 5,513,245 | * 4/1996 | Mizikovsky et al. | 455/411 |
| 5,537,474 | * 7/1996 | Brown et al. | 455/411 |
| 5,689,563 | * 11/1997 | Brown et al. | 455/411 |
| 5,765,105 | * 6/1998 | Kuriki | 455/410 |
| 5,875,404 | * 2/1999 | Messiet | 455/411 |
| 5,883,960 | * 3/1999 | Maruyama et al. | 455/411 |
| 5,898,783 | * 4/1999 | Rohrbach | 455/411 |
| 5,933,773 | * 8/1999 | Barvesten | 455/411 |
| 6,026,293 | * 2/2000 | Osborn | 455/411 |
| 6,067,529 | * 5/2000 | Ray et al. | 455/466 |
| 6,085,099 | * 7/2000 | Ritter et al. | 455/466 |
| 6,112,078 | * 8/2000 | Sormunen et al. | 455/411 |
| 6,112,099 | * 8/2000 | Ketola | 455/466 |

FOREIGN PATENT DOCUMENTS

| | | |
|---|---|---|
| 0 636 963 A2 | 2/1995 | (EP). |
| 100554 | 8/1998 | (EP). |
| WO 95/19593 | 7/1995 | (WO). |
| WO 97/31306 | 8/1997 | (WO). |
| WO 98/42173 PCT/SE 98/02027 | 10/1998 3/1999 | (WO). (WO). |

OTHER PUBLICATIONS

Digital Cellular Telecommunications System (Phase 2+); Specification of the SIM Application Toolkit for the Subscriber Identity Module—Mobile Equipment (SIM–ME) Interface (GSM 11.14 Version 5.4.0) Technical Specification GSM 11.14, Version 5.4.0 Release Jul. 1997; Global System for Mobile Communications; European Telecommunication Standards Institute (ETSI); TS/SMG–091114QR2 (1997–7); pp. 1–56.

Data Services On PCN; Colloquium on Roaming with Data by A.C. Gidlow, XP 000672071; 1995 The Institution of Electrical Engineers; Mar. 6, 1995, pp. 1/3–8/3.

* cited by examiner

*Primary Examiner*—Nay Maung
(74) *Attorney, Agent, or Firm*—Jenkens & Gilchrist, P.C.

(57) ABSTRACT

A method, and associated apparatus, improves the authentication security of authentication procedures performed by a wireless host when requesting access to communicate with a host site of a private network. A password is generated by the execution of an application at a processing device of a SIM (subscriber identity module) defined in the GSM Phase 2+ system. When generated thereat, improved authentication security results as computations need not be performed at a wireless host or other separate physical entity.

22 Claims, 5 Drawing Sheets

METHOD, AND ASSOCIATED APPARATUS, FOR SELECTIVELY PERMITTING ACCESS BY A MOBILE TERMINAL TO A PACKET DATA NETWORK

The present invention relates generally to a manner by which to authenticate a wireless host to communicate with a host site of a limited-access network. More particularly, the present invention relates to a method, and associated apparatus, by which computations associated with authentication procedures, such as the formation of a password, are performed at a mobile terminal to which the wireless host is connected. The computations need not be performed at the wireless host, or other separate physical entity. Because the computations are not performed at the wireless host or other separate physical entity, improved authentication security results.

In the exemplary implementation, use is made of a processing device forming a portion of a SIM (subscriber identity module), defined in the GSM (Global System for Mobile Communications) cellular, communication system, specification reference ISO/IEC/7816. During authentication procedures, when a wireless host is to be authenticated, a password formed, or otherwise stored, at the processing device of the SIM is forwarded to an authentication server of the private network. If the wireless host connected to the mobile terminal is authenticated, responsive to the values of the password, the wireless host is permitted to communicate with a host site of the private network.

In a further exemplary implementation, an encryption key is formed, or otherwise stored, by the processing device of the SIM. The encryption key is used to encrypt data generated at the wireless host and transmitted to the host site of the private network by way of the mobile terminal.

BACKGROUND OF THE INVENTION

Advancements in communication technologies have permitted the development, implementation, and widespread usage of new types of communication systems. Information can be communicated between sending and receiving stations located at sites at which communication had been precluded, at thruput rates previously not practical, and at quality levels previously unattainable.

Advancements in the field of radio communication technologies have permitted the implementation of communications by way of digital cellular communication systems. High-quality communications can be effectuated by way of a mobile terminal positioned at any location within a coverage area of the network infrastructure of the digital cellular communication system without the need of a wireline connection extending to the mobile terminal.

At least one type of digital, cellular communication system, the GSM (Global System for Mobile Communications) system, provides for the communication of both circuit-switched data as well as packet-data. The capability to communicate packet-data by way of a mobile terminal permits, for instance, host sites connected to the Internet to be accessed by way of a mobile terminal operable in the GSM communication system. By connecting a wireless host, such as a laptop computer, to the mobile terminal, otherwise-conventional packet-data communications between the wireless host and the host site of the Internet are possible.

Communications between the wireless host and a host site of a private network connected to the Internet can similarly be effectuated. A private network is typically a limited-access network in which access to host sites of the private network is limited only to users authorized to access such host site.

When the private network is connected to the Internet, or other external network, security procedures, such as authentication procedures, are carried out when access to a host site of the private network is requested from a location beyond the private network. Selective access to the host site of the private network is permitted as the request from the remote location to access the host site of the private network must be authenticated to have been originated at a host authorized to access the private network.

In one typical authentication procedure, a password is generated at the site requesting access to the host site of the private network. In some systems, a symmetric cryptographic technique is used to create and authenticate the password; in other communication systems asymmetric cryptographic techniques are utilized to create and authenticate the password.

In conventional operation of a GSM cellular communication system, the mobile terminal includes a SIM (subscriber identity module) which is releasably coupled to the mobile terminal. The SIM includes subscriber information including, for instance, data used to permit the mobile terminal to gain access to the network infrastructure of the GSM communication system.

A SIM constructed pursuant to the GSM Phase 2+ specification, namely at the ISO/IEC/7816 specification, includes a password generator formed on the SIM. The password generator produces a password, and the password generator includes an encryption algorithm, a secret key, and additional algorithms which, when executed, generate the password. The SIM is connected to a wireless host by way of an interface or is separated from the wireless host. If the SIM is connected to the wireless host, a password and/or encryption key is generated at the SIM and provided to the wireless host by way of the interface. If the SIM is not connected to the wireless host, the password has to be separately entered, such as by user, type-written entry, to the wireless host.

In the existing art, therefore, the password generator is physically separated from the mobile terminal. Compromise of authentication security is possible as a separate physical entity is used to generate the password.

A manner by which to ensure better the authentication security of a wireless host requesting access to a private network would therefore be advantageous.

It is in light of this background information related to accessing of private networks would therefore be advantageous.

SUMMARY OF THE INVENTION

The present invention, accordingly, advantageously provides a method, and associated apparatus, by which computations associated with authentication procedures, such as the formation of a password at a mobile terminal connected to a wireless host can be carried out. The password used in authentication procedures to authenticate the wireless host to permit its access to a private network is formed at a processing device carried with the mobile terminal and releasably connected thereto.

In an exemplary embodiment, the processing device at which the password is formed, or otherwise stored, forms a portion of a SIM (subscriber identity module) removably attached to the mobile terminal. Because the computations performed to form or store the password are performed at a processing device carried by the mobile terminal, improved authentication security is provided, better to assure that only authorized wireless hosts are permitted to gain access to a private network.

The present invention also provides a method, and associated apparatus, by which computations associated with the formation of an encryption key used in encryption procedures are carried out at a mobile terminal connected to a wireless host. Improved encryption security is again permitted as computations involved in the formation of an encryption key need not be performed at a separate physical entity. Again, in an exemplary implementation, the processing device at which the encryption key is formed forms a portion of a SIM defined in the GSM communication system, specification reference ISO/IEC/7816. Encryption security is better assured as the encryption key is formed, or otherwise stored, at the SIM.

In one aspect of the present invention, when communications are to be initiated between the wireless host and a host site of a private network, an authentication server at the private network requests that a password be provided thereto and forwards the request to the mobile terminal. Once the request is received at the mobile terminal, a password-generation application is executed at the SIM to generate a password. Once formed, the password is provided to the wireless host to be used thereafter in authentication procedures with the authentication server. The authentication server, for instance, compares the password provided thereto with an internally-generated value. Responsive to the comparison, access is selectively provided to the wireless host to access the host site of the private network.

In analogous manner, an encryption key is generated through execution of an application on the SIM. Once formed, the encryption key is provided to the wireless host and utilized to encrypt information which is to be communicated to the host site of the private network. The encryption of encrypted signals received at the wireless host are also analogously de-encrypted by utilization of an analogously-generated, de-encryption key.

In another aspect of the present invention, when communications are to be initiated by the wireless host with a host site of a private network, the authentication server generates a request for a password to be provided thereto. The request is communicated to the mobile terminal to which the wireless host is coupled by way of a control channel, data channel, or other type of logical channel. In an exemplary implementation, the authentication server forwards a message to an SMS (short message service) center, and an SMS message, as defined in the GSM (Global System for Mobile Communication) specification, Section 11.14, is transmitted to the mobile terminal. When received at the mobile terminal, an application is executed at the processing device of the SIM to generate a password, And, the password is provided to the wireless host to be used to authenticate the wireless host with the authentication server. In one implementation, the password is compared with an internally-generated value. Responsive to the comparison, access is selectively provided to the wireless host to communicate with the host site of the private network. In analogous fashion, an SMS message, or the like, is used to request the formation of an encryption key through execution of an encryption key-generation application at the processing device of the SIM.

In another aspect of the present invention, passwords are formed at the authentication server and transmitted to the mobile terminal. Once received at the mobile terminal, a password-generation application is executed at the SIM to store the password at a storage location of the SIM. Thereafter, when communications between the wireless host and the host site of the private network are initiated, the stored password is retrieved and used to authenticate the wireless host. In analogous fashion, an encryption key is also generated at an authentication server and forwarded to the mobile terminal. An encryption key-generation application is executed at a processing device of the SIM to store the encryption key at a storage location of the SIM. The encryption key is retrieved and used by the wireless host to encrypt information to be communicated to the host site of the private network.

In these and other aspects, therefore, an assembly, and an associated method, selectively permits access by a mobile terminal to a packet data network. When the mobile terminal is provided access to the packet data network, communications between the mobile terminal and a host site of the packet data network are permitted. A processing device is releasably coupled to, and carried by, the mobile terminal. The processing device has a password-generation algorithm executable thereon. The processing device generates a password when the password-generation algorithm is executed and provides the password to the mobile terminal for transmission therefrom to the wireless network. An authentication server is coupled to the packet data network and forms a portion thereof. The authentication server receives the password transmitted by the mobile terminal and routed thereto by way of the wireless network. The authentication server authenticates the mobile terminal responsive to values of the password generated by the processing device and received at the authentication server. The mobile terminal is permitted to communicate with the host site when the password is authenticated by the authentication server.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
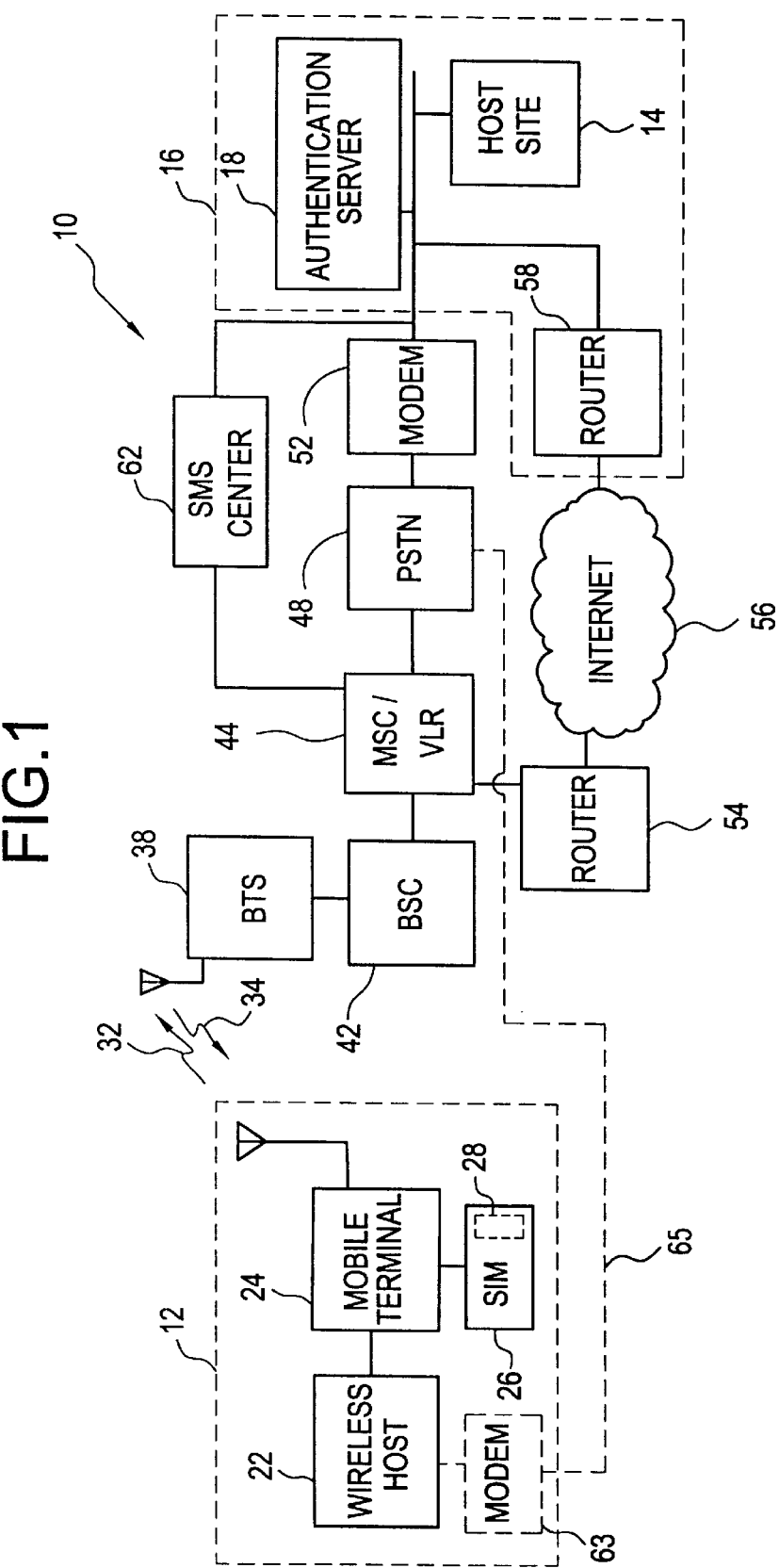
FIG. 1 illustrates a functional block diagram of a communication system in which an embodiment of the present invention is operable.

Referring first to FIG. 1, a communication system, shown generally at 10, permits the communication of data generated at a wireless communication station 12 and a host site 14 of a private network 16. The private network 16 here forms a private intranet formed of a plurality of host sites of which the host site 14 is exemplary, coupled together in a network connection.

The private network 16 further includes an authentication server 18 operable, inter alia, to permit selective access to a host site, such as the host site 14, of the private network. That is to say, when a request, originated by a source external to the private network 16 is made to access a host site of the private network, the authentication server 18 authenticates the source at which the request to access the host site is originated. Through such authentication, only a requesting source which is authorized to access the host site is permitted access thereto. If the originating source is authenticated, communications with the host site are permitted.

The wireless communication station 12 is exemplary of an originating source external to the private network 16. The wireless communication station 12 includes a wireless host 22, such as a laptop computer, and a mobile terminal 24, here a mobile terminal operable in a GSM (Global System for Mobile Communications) communication system.

A SIM (subscriber identity module) 26 is carried by the mobile terminal and is releasably coupled thereto. In the exemplary embodiment, the SIM 26 is of a construction conforming with the standards set forth in the ISO/IEC/7816 of the standard GSM Phase 2+ specification.

The SIM 26 of the GSM Phase 2+ system is sometimes referred to as a proactive SIM and includes a processing device 28. Algorithms forming applications executable upon the processing device 28 cause, e.g., the mobile terminal 24 to transmit an SMS (short message service) message or cause data to be displayed upon a display element (not separately shown) of the mobile terminal.

Operation of an embodiment of the present invention utilizes the processing capacity of the SIM 26 in authentication procedures by which the wireless host 22 of the wireless communication station 12 is authenticated, thereby to permit communications between the wireless host 22 and a host site, such as the host site 14 of the private network 16.

The mobile telephone 24 communicates by way of a radio link, here represented by uplink signals 32 and downlink signals 34 with the network infrastructure of a PLMN (public land mobile network). In the exemplary embodiment, the PLMN is constructed according to the standard, GSM specification.

Here, the PLMN is shown to include a base transceiver station (BTS) 38 operable to receive uplink signals 32 generated by the wireless communication station and to generate downlink signals 34 for transmission to the wireless communication station. The BTS 38 is coupled to a base station controller (BSC) 42 which controls operation of a group of base stations, including the base station 38. The base station controller 42 is, in turn, coupled to an MSC/VLR (mobile switching center/visited location register) 44.

In the exemplary embodiment in which the infrastructure of the PLMN forms a portion of a GSM communication system, the elements of the network infrastructure, as well as the air interface formed between the wireless communication station 12 and the base station 38, are defined by the specification standards of the GSM system.

The MSC is coupled, in conventional fashion, to a PSTN (public-switched telephonic network) 48. And, a modem 52 couples the PSTN 48 to the private network 16. Thereby, a communication path is provided between the wireless communication station 12 and the private network 16 by way of a radio link, the network infrastructure of the PLMN, the PSTN 48, and the modem 52.

The PLMN is further coupled to a router 54 which, in turn, is coupled to an Internet network 56. And, the Internet network is coupled to a second router 58. The router 58 also forms a portion of the private network 16. A communication path is also formed between the wireless communication station 12 and the private network 16 by way of a radio link, the network infrastructure of the PLMN, the routers 54 and 58, and the Internet network 56.

An SMS (short message service) center 62 is further illustrated in the Figure. The SMS center 62 permits messages generated at the private network to be formed into SMS messages at the SMS center 62. SMS messages are transmitted upon a control channel, in conventional manner, as defined in the GSM standard specification.

In one embodiment, the wireless communication station 12 further includes a modem 63, shown in dash, connectable by way of a wireline connection 65, to the PSTN 48. Operation of the communication 12, via the wireline connection 65, is similarly possible, as shall be described below.

Figure 2:
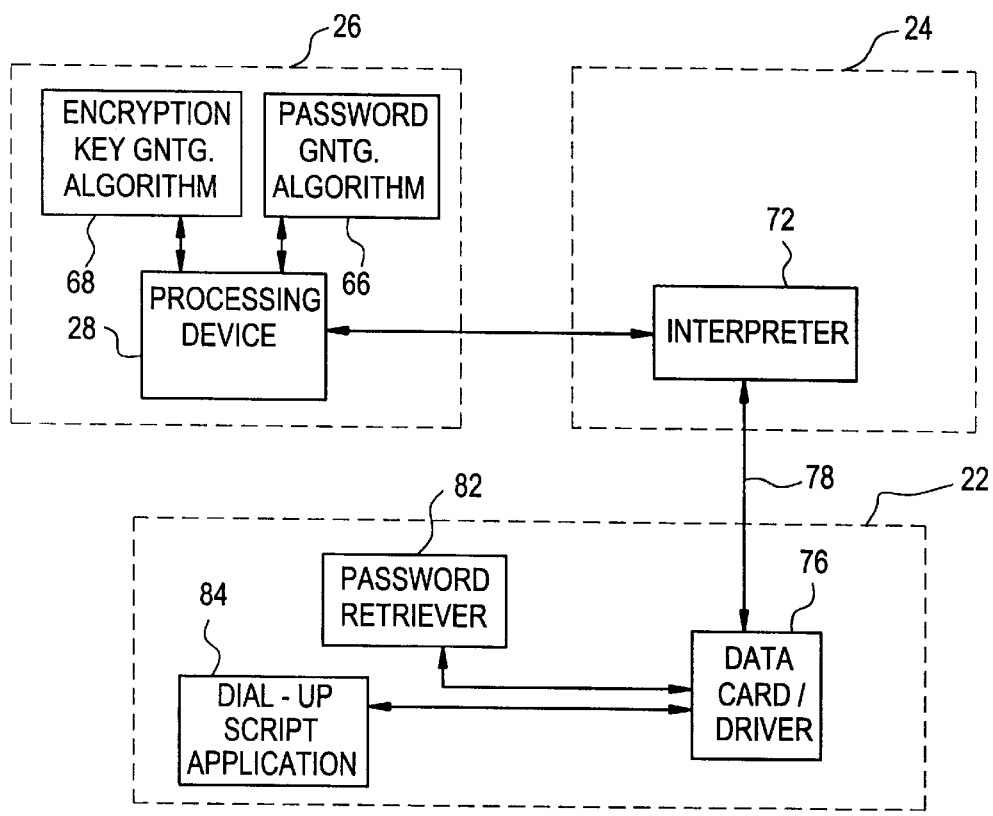
FIG. 2 illustrates a functional block diagram of a wireless communication station, including a wireless host and a mobile terminal which carries a SIM, operable pursuant to an embodiment of the present invention.

FIG. 2 illustrates functional components of the wireless communication station 12 of an exemplary embodiment in greater detail. The communication station 12 is again shown to include the mobile terminal 12, a SIM 26 carried therewith, and a wireless host 22. The SIM 26 is again shown to include a processing device 28 capable of executing algorithms forming applications. Here, a password generating application 66 and an encryption key-generating application 68 are shown to be applications which are executed by the processing device 28.

Two-way communications are permitted between the SIM 26 and circuitry, including an interpreter 72. Because the processing device 28 of the SIM 26 is carried by the mobile terminal 24, execution of the applications 66 and 68 can be effectuated without reliance upon external devices, such as the wireless host 22. Greater levels of authentication and encryption security are thereby possible.

The wireless host 22, here a laptop computer, is shown to include a data card/driver 76 which is coupled by way of the lines 78 with the mobile terminal 24. And, the laptop computer forming the wireless host 22 further includes a password retriever 82 and a dial-up script application 84. In one embodiment, the data card forms a physical entity, as illustrated, and forms an Ericsson DC23™ data card, or the like. In another embodiment, the functionality of the data card is software-implemented. And, in another embodiment, the functionality of the data card is formed at the mobile terminal.

During operation of an embodiment of the present invention, when communications are to be initiated between the wireless host 22 and the host site 14 of the private network 16, a password is generated when a dial-up session starts on the wireless host 22, here by execution of the dial-up script application 84. In contrast to the conventional practice of permitting a user of the wireless host 22 to fill in a password field on the dial-up client of which the wireless host is formed, the dial-up script application 84 is used to take care of the generated password, to be used during authentication procedures.

Generation of the password takes place on the SIM 26 by execution of the password generating application 66 by the processing device 28. To generate the password at the SIM 26, a password retriever application is executed at the wireless host 22 through the generation of AT-commands which are provided to the SIM 26 by way of the data card/driver 76 and the mobile terminal 24. The password generating application 66 is thereafter executed by the processing device 28, and the password, once generated, is returned, in reverse direction, to the dial-up script application 84.

When the request to initiate communications generated responsive to the dial-up script application is forwarded to the private network 16, authentication procedures commence. The authentication server 18 of the private network 16 requests that the wireless host forward the password to the authentication server. When the request for the password is received at the wireless host, the dial-up application script is executed and the password is forwarded to the authentication server. The request by the authentication server is routed, either by way of the Internet network and routers 54 and 58 or by way of the PSTN 48, or through generation of an SMS message formed by the SMS center 62.

When the authentication server 18 receives the password, the authentication server 18 compares the received password with an internally-generated value. Responsive to the comparison, the authentication server 18 selectively permits access by the wireless host 22 to the host site 14 of the private network 16. That is to say, according to a conventional, symmetric cryptographic technique, if the received password corresponds with an internally-generated value, the wireless host 22 is authenticated. In another embodiment, authentication is effectuated by way of an asymmetric cryptographic technique.

Figure 3:
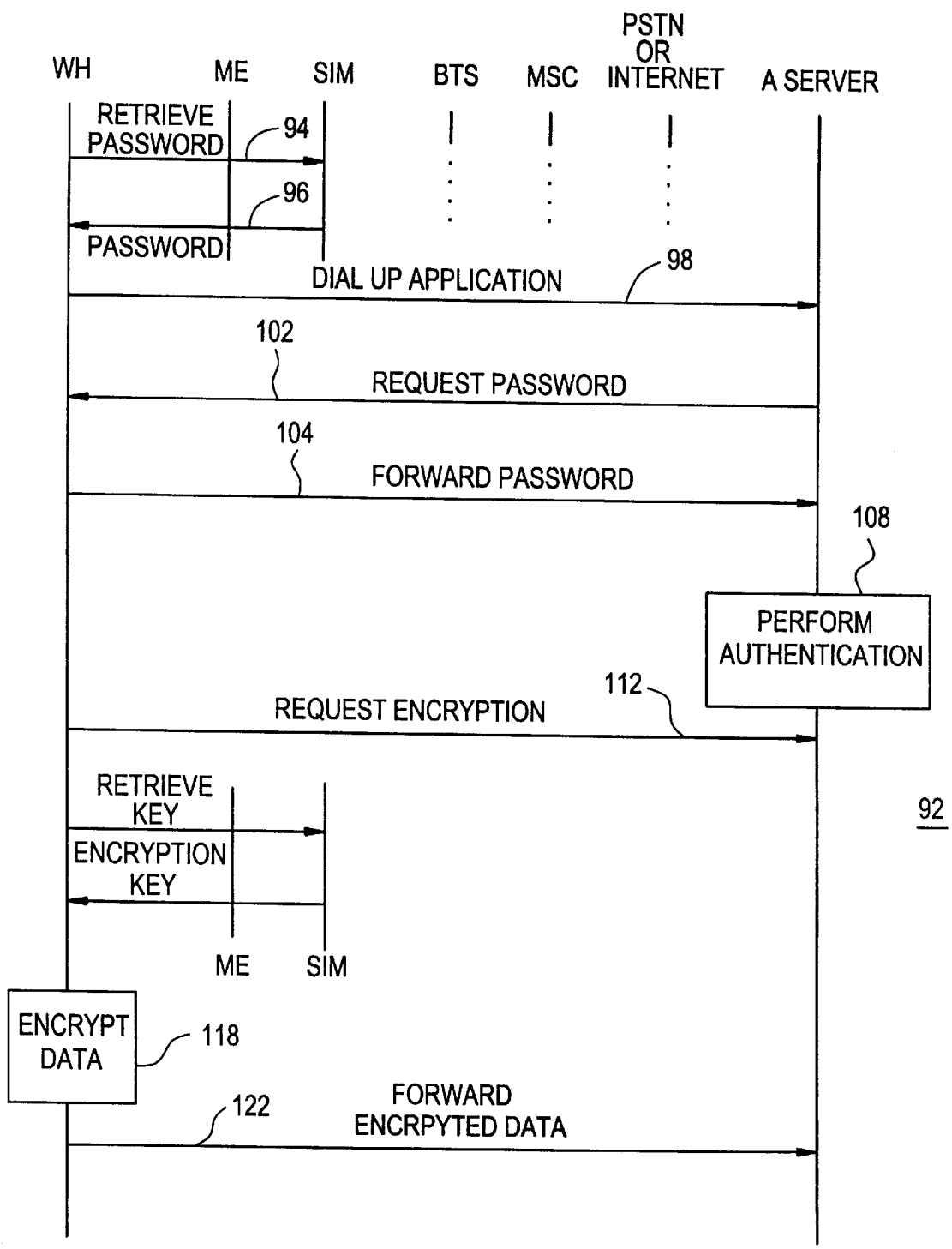
FIG. 3 illustrates a sequence diagram listing the sequence of signal generation during operation of an embodiment of the present invention.

FIG. 3 illustrates a sequence diagram, shown generally at 92, which shows the sequence of signal generation during operation of an embodiment of the present invention. First, and as indicated by the sequence segment 94, the wireless host 22 generates a retrieve password request which is provided to the SIM 26. A password generation application is executed at the processing device 28 of the SIM. Once generated, and as indicated by the sequence segment 96, the password is returned to the wireless host 22. The wireless host 22 also executes the dial-up script application 84 and generates a request to initiate communications with the host site of the private network 16. The request is forwarded, and as indicated by the sequence segment 98, to the authentication server 18.

When the authentication server 18 receives the request, a response is generated, indicated by the sequence segment 102, requesting that the wireless host forward a password thereto. The wireless host 22 responds by forwarding the password, indicated by the sequence segment 104, to the authentication server 18. Thereafter, authentication of the wireless host 22, responsive to the value of the password forwarded thereto. The authentication is indicated by the block 108 and, in one embodiment, is effectuated by comparing the password forwarded thereto with an internally generated value. If the comparison results in password correspondence, the wireless host is authenticated, and the wireless host is permitted to communicate with the host site of the private network.

The sequence diagram further illustrates further operation of an embodiment of the present invention by which the authentication server requests that an encryption key be generated. The request is indicated in the Figure by the sequence segment 112. When the wireless host receives the request, a request is generated, as indicated by the sequence segment 114, to cause the encryption key-generating application 68 to be executed at the SIM 26. Once the encryption key is generated, and as indicated by the sequence segment 116, the encryption key is provided to the wireless host 22. Thereafter, and as indicated by the block 118, data to be communicated by the wireless host 22 is encrypted. Thereafter, and as indicated by the sequence segment 122, encrypted data is forwarded by the wireless host 22 to the host site of the private network.

In an alternate embodiment, the communication station 12 is connected, through the modem 63 of the communication station by way of the wireline connection 65, with the PSTN. In such an embodiment, the request by the authentication server, indicated by the sequence segment 102, and the response thereto, indicated by the sequence segment 104, is effectuated by way of the wireline connection 65. Such an embodiment is useful when radio communication is unavailable but a wireline connection is available. In such an alternate embodiment, the sequence diagram illustrative of the alternate signalling would only differ in that the sequence segments would be routed to the PSTN by way of the modem and the wireline connection rather than by way of the BTS and MSC of the wireless network.

Figure 4:
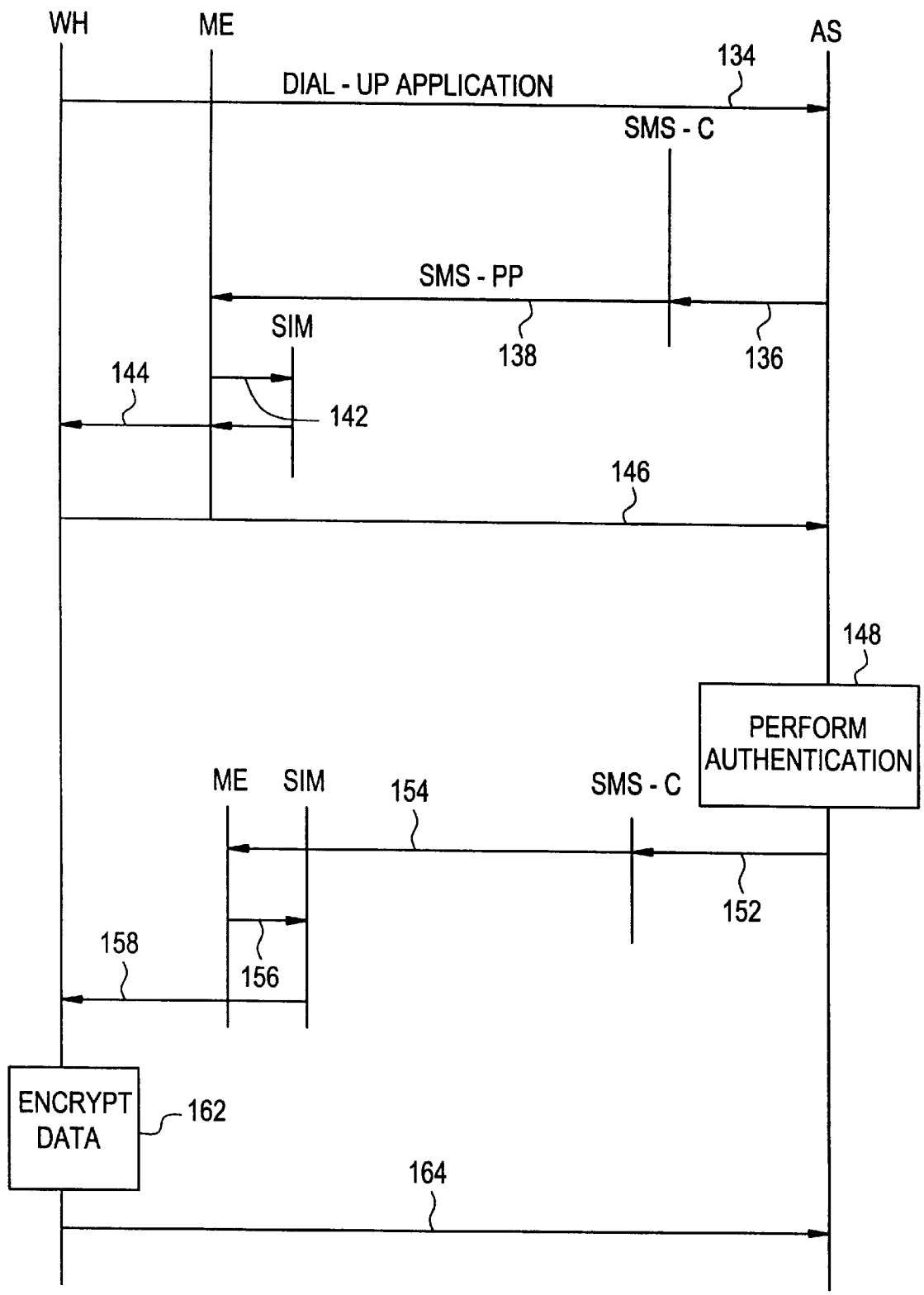
FIG. 4 illustrates a sequence diagram listing the sequence of signal generation during operation of another embodiment of the present invention.

FIG. 4 illustrates a sequence diagram, shown generally at 132, operation of another embodiment of the present invention is illustrated. Here, again, when communications are initiated by the wireless host 22 with a host site of a private network, the dial-up script application 84 is executed and a request to initiate communications is forwarded, as indicated by the sequence segment 134, to the authentication server 18.

When the request is received by the authentication server 18, the server 18 requests the SMS center 62, as indicated by the sequence segment 136, to generate an SMS message to request that a password be generated and forwarded to the authentication server. The SMS center 62 causes generation of an SMS message, here indicated by the sequence segment 138, which is forwarded to the mobile terminal 24. The mobile terminal, in turn, requests generation of a password, here represented by the sequence segment 142, to the SIM 26 whereat the password generation application is executed by the processing device 28. Once generated, the password is returned, indicated by the sequence segment 144, to the mobile terminal 24 and, in turn, to the wireless host 22. Then, and as indicated by the sequence segment 146, the password is forwarded to the authentication server and the wireless host is authenticated, indicated by the block 148. If the wireless host is authenticated, communications with the host site of the private network are thereafter permitted.

FIG. 4 further illustrates a request by the authentication server for the generation of an encryption key by which to encrypt data communicated between the wireless host and the host site. First, and as indicated by the sequence segment 152, the request is forwarded to the SMS center 62. The SMS center 62 generates an SMS message, here indicated by the sequence segment 154 which is forwarded to the mobile terminal 24. The mobile terminal requests the SIM to generate an encryption key, here indicated by the sequence segment 156. Responsive thereto, the processing device 28 of the SIM executes the encryption key-generating application 68 and returns then encryption key, indicated by the sequence segment 158, to the wireless host 22. The wireless host thereafter utilizes the encryption key to encrypt data, indicated by the block 162. And, data once encrypted is forwarded, as indicated by the sequence segment 164.

Figure 5:
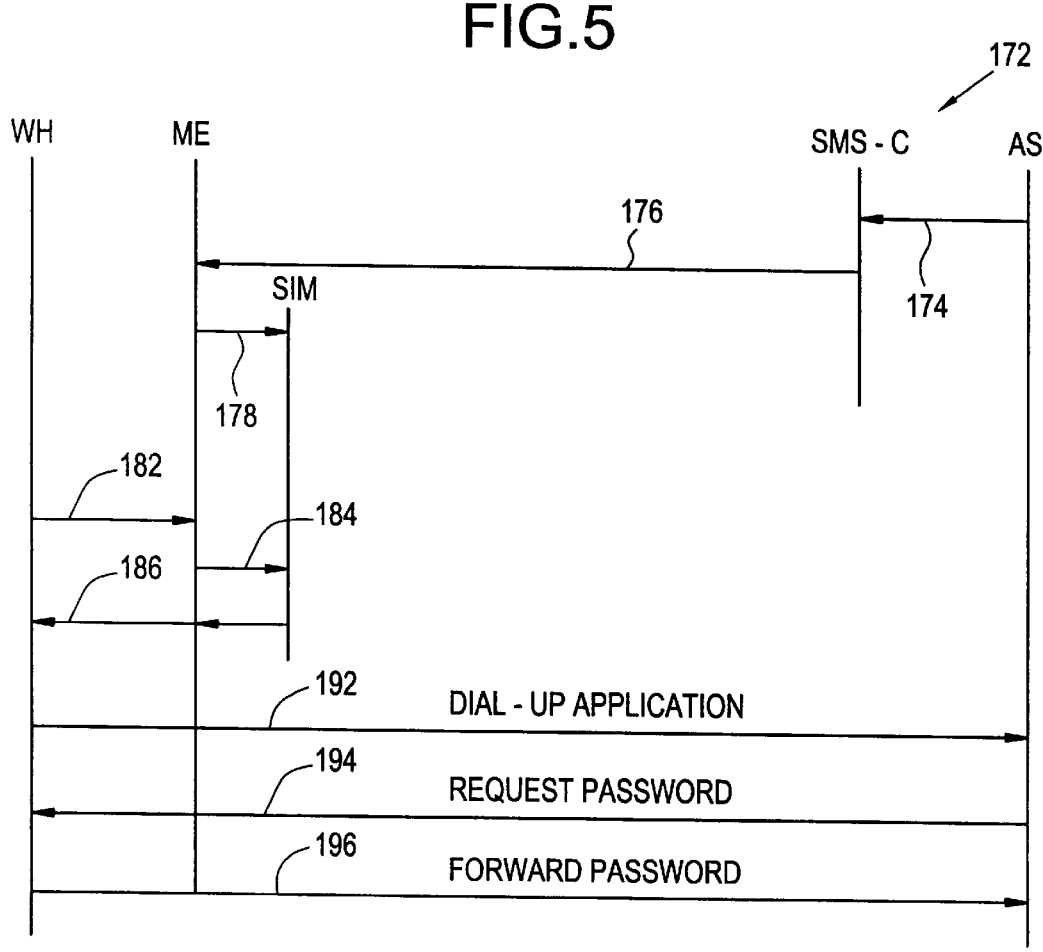
FIG. 5 illustrates a sequence diagram listing the sequence of signal generation during operation of another embodiment of the present invention.

FIG. 5 illustrates another sequence diagram, shown generally at 172, here showing operation of another embodiment of the present invention. In this embodiment, the authentication server generates passwords at selected intervals. The passwords are forwarded to an SMS center 62, indicated by the sequence segment 174. The SMS center 62 generates SMS messages and transmits the SMS messages, here indicated by the sequence segments 176, to the mobile terminal 24. The mobile terminal 24 forwards the passwords, indicated by the sequence segment 178, to the SIM 26. The password generation application 66, when executed by the processing device 28, is here operable to store the password provided thereto at a storage location. The stored password becomes the password thereafter to be utilized during authentication procedures when communications are initiated by the wireless host 22.

When communications are initiated by the wireless host 22, a request is forwarded to the mobile terminal, indicated by the sequence segment 182, to the mobile terminal. A request to retrieve the stored password is forwarded, indicated by the sequence segment 184, to the SIM 26. The password generation application 66 is further operable to retrieve the stored password from the storage location and to return the stored password, here indicated by the sequence segment 186, to the mobile terminal and, in turn, to the wireless host 22.

The dial-up application 84 is executed and the request to initiate communications is forwarded to the authentication server, as indicated by the sequence segment 192. The authentication server requests, indicated by the sequence segment 194, that the wireless host provide a password thereto. Thereafter, and as indicated by the sequence segment 196, the password is forwarded to the authentication server 18 whereat authentication procedures are performed.

While not separately shown, in this embodiment, the authentication server 18 further generated encryption keys at selected intervals, also to be stored at storage locations and used thereafter for encryption of data communicated by the wireless host 22.

In an alternate embodiment, once the password has been downloaded to the communication station 12 and the password generation application 66 is operable to store the password at a storage location, the communication station can thereafter be connected, through its modem 63, via the wireline connection 65 with the PSTN. In such an embodiment, the sequence segments 192, 194, and 196 are effectuated by way of the wireline connection rather than by a radio link.

Thereby, through operation of an embodiment of the present invention, greater authentication and encryption security is assured. Because computations are not performed at a separate physical entity, the improved security results.

The previous descriptions are of preferred examples for implementing the invention, and the scope of the invention should not necessarily be limited by this description. The scope of the present invention is defined by the following claims.

What is claimed is:

1. In a communication system having a wireless network and a packet data network coupled thereto, the packet data network including a host site and permitting selective access thereto, the wireless network permitting radio communications with a mobile terminal, an improvement of an assembly for selectively permitting access by the mobile terminal to the packet data network, thereby to permit communications between the mobile terminal and the host site, said assembly comprising:

a processing device releasably coupled to, and carried by, the mobile terminal, said processing device having a password-generation algorithm executable thereon, said processing device for generating a password when the password-generation algorithm is executed; and an authentication server coupled to the packet data network and forming a portion thereof, said authentication server for receiving the password generated responsive to execution of the password-generation algorithm, said authentication server for authenticating the mobile terminal responsive to values of the password generated by said processing device and received at said authentication server, the mobile terminal permitted to communicate with the host site when the password is authenticated by said authentication server.

2. The assembly of claim 1 wherein the mobile terminal generates a retrieve password command and wherein said processing device is coupled to receive the retrieve password command, the password-generation algorithm executed at said processing device when the retrieve password command is received thereat.

3. The assembly of claim 2 wherein the password-generation algorithm, when executed by said processing device, prompts the mobile terminal for an input code and wherein the password generated by the execution of the password-generation algorithm is responsive, in part to the input code provided by the mobile terminal.

4. The assembly of claim 1 wherein the mobile terminal generates a communication initiation request to initiate communication with the host site and wherein said authentication server requests transmission thereto of the password generated by said processing device responsive to the communication initiation request.

5. The assembly of claim 1 wherein the wireless network comprises a GSM (general system for mobile communications) network, wherein the mobile terminal includes a SIM (Subscriber Identity Module) card releasably connected thereto, and wherein said processing device is disposed upon the SIM card.

6. The assembly of claim 1 wherein said authentication server compares values of the password generated by the mobile terminal with internally-generated values and wherein the mobile terminal is authenticated if the values of the password correspond with the internally-generated values.

7. The assembly of claim 1 wherein said processing device further has an encryption algorithm executable thereon, said processing device for generating an encryption key by which to encrypt information transmitted by the mobile terminal.

8. The assembly of claim 1 wherein the wireless network further includes an SMS (short message service) center and provides for the communication of SMS messages with the mobile terminal, wherein the mobile terminal generates a communication initiation request to initiate communication with the host site and wherein said authentication server requests with an SMS-message transmission thereto of the password generated by said processing device responsive to the communication initiation request.

9. The assembly of claim 1 wherein a control channel is formed between the wireless network and the mobile terminal, wherein the mobile terminal generates a communication-initiation request to initiate communication with the host site and wherein said authentication server requests, with a message broadcast upon the control channel, for transmission thereto of the password generated by said processing device.

10. The assembly of claim 9 wherein the mobile terminal generates a retrieve password command responsive to reception thereat of the message broadcast on the control channel and wherein said processing device is coupled to receive the retrieve password command, the password-generation algorithm executed at said processing device when the retrieve password command is received thereat.

11. The assembly of claim 1 wherein said processing device further comprises a first storage location, wherein said authentication server forms first internally-generated values and forwards the first internally-generated values to the mobile terminal, and wherein the algorithm executed by said processing device generates the password with values corresponding to the first internally-generated values and stores the password so-formed at said first storage location.

12. The assembly of claim 11 wherein the mobile terminal generates a retrieve password command when communications are to be initiated with the host site, wherein the password-generation algorithm executed at said processing device to retrieve the password stored at said first storage location when the retrieve password command is received thereat.

13. The assembly of claim 11 wherein said authentication server forms the first internally-generated values at selected intervals.

14. The assembly of claim 11 wherein said processing device further comprises a second storage location, wherein said authentication server forms second internally-generated values and forwards the second internally-generated values to the mobile terminal, and wherein said processing device further has an encryption algorithm executable therein, the encryption algorithm for retrieving the second internally-generated values and for storing the second internally-generated values at the second storage location as an encryption key.

15. The assembly of claim 14 wherein said processing device retrieves the encryption key stored at said second storage location and provides the encryption key to the mobile terminal to encrypt information transmitted therefrom.

16. The assembly of claim 1 further comprising a modem connected to the mobile terminal and a wireline connection for coupling the modem together with the packet data network and wherein said authentication server receives the password by way of the wireline connection.

17. A method for selectively permitting access by a mobile terminal to a host site of a packet data network, the packet data network coupled to a wireless network, the wireless network permitting radio communications with the mobile terminal, said method comprising the steps of:
generating automatically a password at a processing device releasably coupled to the mobile terminal;
providing the password generated in said step of generating to the mobile terminal;
forwarding the password provided to the mobile terminal to an authentication server;
authenticating the mobile terminal responsive to values of the mobile terminal forwarded thereto; and
permitting the mobile terminal to communicate with the host site if the password is authenticated during said step of authenticating.

18. A method for selectively permitting access by a mobile terminal to a host site of a packet data network, the packet data network coupled to a wireless network, the wireless network permitting radio communications with the mobile terminal, said method comprising the steps of:
generating a password at a processing device releasably coupled to the mobile terminal;
providing the password generated in said step of generating to the mobile terminal;
forwarding the password provided to the mobile terminal to an authentication server;
authenticating the mobile terminal responsive to values of the mobile terminal forwarded thereto;
permitting the mobile terminal to communicate with the host site if the password is authenticated during said step of authenticating; and
wherein the wireless network comprises a GSM (general system for mobile communications) network, wherein the mobile terminal includes a SIM (subscriber identity module) card and wherein the processing device at which the password is generated is positioned at the SIM card.

19. A method for selectively permitting access by a mobile terminal to a host site of a packet data network, the packet data network coupled to a wireless network, the wireless network permitting radio communications with the mobile terminal, said method comprising the steps of:
generating automatically a password at a processing device releasably coupled to the mobile terminal;
providing the password generated in said step of generating to the mobile terminal;
forwarding the password provided to the mobile terminal to an authentication server;
authenticating the mobile terminal responsive to values of the mobile terminal forwarded thereto;
permitting the mobile terminal to communicate with the host site if the password is authenticated during said step of authenticating; and
wherein the wireless network further includes an SMS (short message service) center and provides for the communication of SMS messages with the mobile terminal and wherein said method comprises the additional step of requesting by the authentication server with an SMS message for said forwarding of the password thereto.

20. A method for selectively permitting access by a mobile terminal to a host site of a packet data network, the packet data network coupled to a wireless network, the wireless network permitting radio communications with the mobile terminal, said method comprising the steps of:
forming first internally-generated values at an authentication server;
forwarding the first internally-generated values to the mobile terminal;
storing the first internally-generated values at a storage location associated with a processing device removably connected to the mobile terminal, the first internally-generated values forming a password;
retrieving the password stored at the storage location during said step of storing when the mobile terminal initiates communications with the host device;
providing the password retrieved during said step of retrieving to the authentication server;
authenticating the mobile terminal responsive to values of the password provided to the authentication-server; and
permitting the communications between the mobile terminal and the host site if the mobile terminal is authenticated during said step of authenticating.

21. A method for selectively permitting access by a wireless communication station that includes a wireless host and a mobile terminal to a host site of a packet data network, the packet data network coupled to a wireless network, the wireless network permitting radio communications with the wireless communication station via the mobile terminal, said method comprising the steps of:
generating electronically a password at a processing device releasably coupled to the mobile terminal;

providing the password from the processing device to the mobile terminal;

providing the password from the mobile terminal to the wireless host;

requesting the password from the wireless communications station by an authentication server via a first wireline link;

forwarding the password from the wireless host to the authentication server via the first wireline link or a second wireline link;

authenticating the wireless communication station responsive to at least one value of the password forwarded to the authentication server; and permitting the wireless communication station to communicate with the host site if the password is authenticated during said step of authenticating.

22. A method for selectively permitting access by a wireless communication station that includes a wireless host and a mobile terminal to a host site of a packet data network, the packet data network coupled to a wireless network, the wireless network permitting radio communications with the wireless communication station via the mobile terminal, said method comprising the steps of:

requesting a password from the wireless communication station by an authentication server via a wireless link;

generating electronically the password at a processing device releasably coupled to the mobile terminal;

providing the password from the processing device to the mobile terminal;

providing the password from the mobile terminal to the wireless host;

forwarding the password from the wireless host to the authentication server via a wireline link;

authenticating the wireless communication station responsive to at least one value of the password forwarded to the authentication server; and permitting the wireless communication station to communicate with the host site if the password is authenticated during said step of authenticating.

* * * * *